United States Patent [19]

Schalow

[11] 4,083,047
[45] Apr. 4, 1978

[54] VEHICLE GUIDANCE SYSTEM

[75] Inventor: Rudolph D. Schalow, Fort Wayne, Ind.

[73] Assignee: Energystics, Fort Wayne, Ind.

[21] Appl. No.: 641,163

[22] Filed: Dec. 16, 1975

Related U.S. Application Data

[63] Continuation-in-part of Ser. No. 494,564, Aug. 5, 1974, abandoned.

[51] Int. Cl.² .............................................. G01S 9/56
[52] U.S. Cl. .................................... 343/7 VM; 343/15
[58] Field of Search .............................. 343/7 VM, 15

[56] References Cited

U.S. PATENT DOCUMENTS

| | | | |
|---|---|---|---|
| 3,181,153 | 4/1965 | Cella | 343/15 X |
| 3,303,499 | 2/1967 | Mahoney et al. | 343/15 |
| 3,744,586 | 7/1973 | Leinauer | 343/7 VM X |

*Primary Examiner*—T.H. Tubbesing
*Attorney, Agent, or Firm*—Ronald D. Welch

[57] ABSTRACT

A vehicle guidance system is disclosed that is suitable for guiding a vehicle or person along a straight line navigational aspect with signaling and processing typical of hyperbolic navigational systems, for example, in certain farming operations where the farm vehicle utilized must repeatedly be caused to traverse an unmarked field in substantially straight parallel paths that are evenly spaced with respect to one another, such as in fertilizing the field. An electronic navigation system is utilized which includes a transmitter and a receiver positioned upon the navigating vehicle and a pair of repeating transmitter/receivers spaced with respect to one another a known or measured distance and along a line normal to the intended straight line path to be followed by the vehicle. The transmitter causes each repeater to be alternately energized and the resulting signal is detected at the vehicle mounted receiver and the phase difference between each transmitted and received signal is measured. The measured signals are then used to determine an error signal if the vehicle has departed from a predetermined straight line path. A typical use in a farming operation is to position two repeaters at one edge of a field and then cause the farm vehicle to repeatedly traverse the field in straight lines that are equally spaced with respect to one another a distance so as to give substantially equal coverage, such as, for example, to substantially evenly fertilize a field.

20 Claims, 10 Drawing Figures

VEHICLE GUIDANCE SYSTEM

This is a continuation in part of U.S. Application Ser. No. 494,564, Filed Aug. 5, 1974, now abandoned.

FIELD OF THE INVENTION

This invention relates to a vehicle navigation and guidance system and more particularly relates to a system for guiding a vehicle along one or more predetermined straight line paths.

BACKGROUND OF THE INVENTION

It is often times necessary and/or desirable that a vehicle be caused to follow a straight line path or a plurality of parallel, evenly spaced straight line paths. Such is the case, for example, where agricultural vehicles must repeatedly traverse a field in parallel straight line paths in connection with a farming operation, such as, again by way of example, applying chemicals to a field. As is well known, it is difficult to traverse a straight line path with a vehicle unless the path is relatively well marked. Such is commonly not the case, however, in many farm fields at the time of chemical application and as a result parallel paths are often not well maintained in repeatedly traversing the field and this results in uneven coverage of the field, and can even result in missed areas as well as areas that might be harmed by over application of certain chemicals when applied to the field. Heretofore, it has been common to overlap application of chemicals to assure against missed areas, but this can lead to damage and is expensive due to waste of chemicals and fuel as well as increasing the time required for a given job. Furthermore, because of the present difficulty being experienced in attempting to maintain straight even paths, such work cannot be performed well at night or during other conditions of limited visibility.

While some devices for establishing straight line paths as well as equal spacing between paths has heretofore been attempted, no such device now known or utilized has been completely successful in accomplishing this end. In addition, no method has heretofore been known or utilized to enable a straight line path to be traversed and more particularly to allow a plurality of parallel straight line paths equally or otherwise spaced to be traversed.

SUMMARY OF THE INVENTION

This invention provides a system for enabling a straight line path to be followed by a vehicle and moreover allow such a vehicle to follow a plurality of parallel straight line paths that may be equally and/or evenly spaced with respect to one another. When utilized with a farm vehicle, this invention allows the vehicle to repeatedly follow a series of parallel straight line paths and thus allows a field to be substantially evenly covered due to the uniform spacing between the paths traversed by the farm vehicle so that, for example, chemicals can be uniformly applied to a field without causing waste due to overlap or causing untreated areas. An electronic indicator system is utilized with deviations from a particular selected straight line path being immediately indicated so that corrections can be readily made, the system also providing for uniform spacing between paths where such straight line paths are to be traversed. In addition, this invention also provides a method for allowing straight line paths to be traversed.

It is therefore an object of this invention to provide a system enabling a vehicle to be moved in a straight line path. The scheme of the invention can use any range deviation measurement however such measurement may be obtained.

It is another object of this invention to provide a system enabling a vehicle to be moved in repeated parallel straight line paths that are evenly spaced with respect to one another.

It is another object of this invention to provide a system for farm vehicles to enable the vehicle to traverse a field in a straight line path.

It is another object of this invention to provide a system for farm vehicles to enable such vehicles to repeatedly traverse a field in parallel straight line paths that are evenly spaced with respect to one another.

It is another object of this invention to provide an electronic indicator system for enabling a vehicle to traverse a straight line path.

It is another object of this invention to provide an electronic indicator system to indicate any deviation from a selected straight line path of a moving vehicle.

It is still another object of this invention to provide an electronic indicator system having a pair of repeaters positioned on a line normal to intended paths of travel of a vehicle having a transmitter and receiver mounted thereon and used to transmit to and receive signals from said repeaters.

It is still another object of this invention to provide a method for enabling straight line travel of a vehicle.

It is yet another object of this invention to provide a method for enabling a plurality of paths to be traversed in a straight line.

Yet another object of this invention is to provide a repeater circuit that provides a phase reference signal without use of a phase lock loop.

Still another object of the invention is to provide a repeater circuit which uses a digital shift register to provide precise and repeatable signal delays.

With these and other objects in view which will become apparent to one skilled in the art as the description proceeds, this invention resides in the novel combination and arrangement of parts substantially as hereinafter described and more particularly defined by the appended claims, and being realized that the scope of the claims is not meant to be limited to the precise embodiment shown.

BRIEF DESCRIPTION OF THE DRAWINGS

The following drawings depict the complete embodiment of the invention according to the mode deemed best for practical application of the principles of the invention, said drawings including the following.

DESCRIPTION OF THE INVENTION

Figure 1:
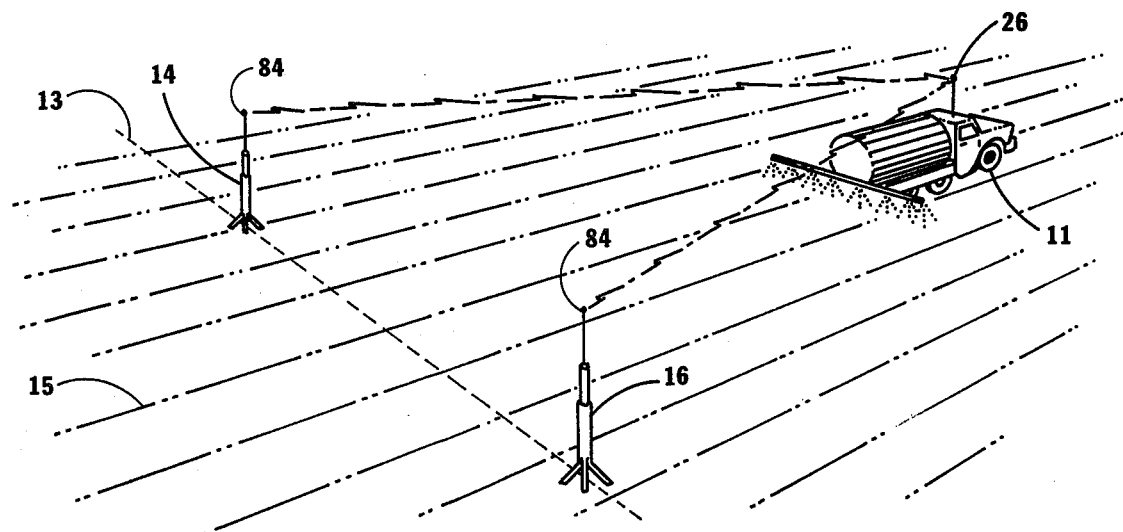
FIG. 1 is a sketch in perspective showing a vehicle with a transmitter and receiver mounted thereon and the relationship of the vehicle to two repeaters spaced therefrom.

Referring now to the drawings, FIG. 1 illustrates positioning of two repeaters 14 and 16 with respect to a master transmitting, receiving, and computing unit mounted on a movable agricultural vehicle 11 to enable the vehicle 11 to be moved along a selected one of a plurality of straight line paths 15 normal to the line 13 formed between the repeaters.

In many navigation and location systems, time of arrival signaling, or equivalently, phase difference measurements, between a receiver and two or more transmitters has been utilized to create hyperbolic lines of position, the intersections of which are used to define the positions of the receiver with respect to the various transmitters.

The present invention creates a particular family of parallel lines of position so that the solution to equations defining receiver position is simple and straightforward. Moreover, in many applications which require that a straight path be followed the exact location of the receiver is not important, that is, the importance lies in the knowledge of the degree of closeness to the desired path. This invention enables a vehicle to traverse a straight line path since any deviation from the selected path will be promptly displayed so that immediate correction can be made. While an indication is utilized in this invention it is to be realized of course that the sensed deviation is generated in the form of an error signal which in turn could be used for automatic correction of any deviation via appropriate and well known guidance systems rather than displaying the same on an indicator for the purpose of enabling manual correction.

Figure 2:
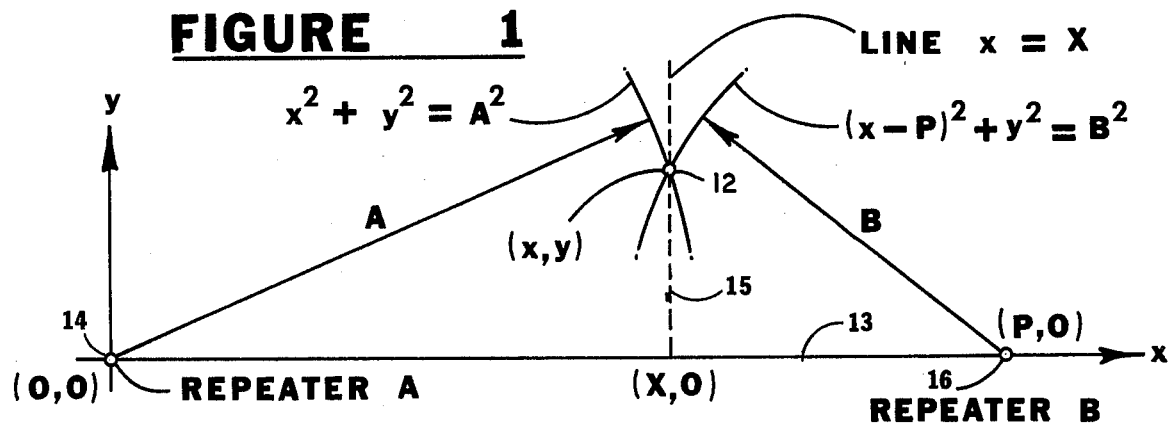
FIG. 2 is an illustration by x, y coordinates showing the theory of operation of the system of this invention.

Referring to FIG. 2 which shows the basic theory of operation of this invention, assume that the master unit is located at the point $(x,y)$ and two repeaters are respectively located at points $a$ and $b$. Point $a$ is assumed to have coordinates $(O,O)$ and point $b$ has coordinates $(P,O)$ where all coordinates are referred to on the cartesian, that is, $(x,y)$ scale. By defining the distances A and B between the master unit and the respective repeaters, with the distance P being known or measured, sufficient information is then available to cause the receiver to remain positioned along the line $x = X$. Since the distance X referred to is arbitrary, positioning along a plurality of straight lines may be precisely controlled by the following argument.

Regardless of the method of obtaining them, let the quantities A, B, and P be known for any master unit position with respect to the repeaters. Then it can be said that the master unit must simultaneously reside on a circle of radius A centered at repeater 14 and on a circle of radius B centered at repeater 16. Expressing the foregoing in terms of cartesian equations we have the system $$x^2 + y^2 = A^2 \quad (1)$$

$$(x - P)^2 + y^2 = B^2 \quad (2)$$

which, when solved for $x$, yields $$x = X = (A - B)(A + B)/2P + P/2 \quad (3)$$

independently of $y$, the distance from the $x$-axis. It is to be noted that this solution is actually the equation of a line normal to the $x$-axis passing through the coordinates $(X,O)$. Examinations shows that for any constant value of P a definite relationship must always exist between the variables A and B if X is to be held constant. Presume now that a desired line of position; namely, $x = X_o$ is to be maintained while a vehicle containing the master unit travels through the field of coordinates. Then by forming the difference $$\text{Error} = X - X_o \quad (4)$$

where X is the actual position as determined from equation (3), and $X_o$ is the actual (and stored) position at the beginning of a path traverse the amount of error in position from the line $x = X_o$ is simply, uniquely, and quickly determined. Moreover, the sign of Error in equation (4) indicates the direction to $X_o$, left or right, and there is no position error when equation (4) is null or zero. Furthermore, if both repeaters lie in the horizontal, that is, the $x-y$ plane or a plane parallel to the $x-y$ plane, the foregoing remains true regardless of the elevation of the master unit.

Thus, a method is devised by which straight line guidance and navigation is made possible for a variety of applications using range information derived in any manner whatsoever, but for which said straight line paths have heretofore not been simply and specifically provided.

A particular implementation of this concept applies to the agricultural chemical applicator vehicle referred to herein in which it is desired to traverse a series of parallel equispaced straight lines in a farm field, although anyone familiar with the art can readily think of numerous other applications, all of which could use variations of the techniques to be described for this preferred embodiment.

Figure 3:
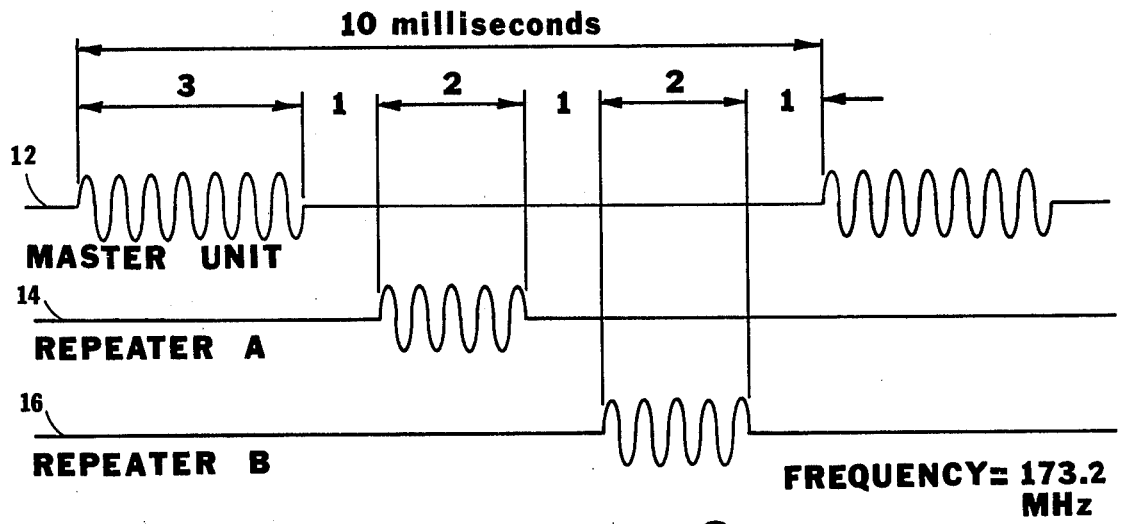
FIG. 3 is a series of wave forms illustrating the transmitter triggering of the pair of repeaters utilized in this invention.

FIG. 3 indicates the method of communicating between each repeater unit indicated generally by reference numeral 14, 16 and the master unit 12. It is shown thereon that the master unit 12 transmits a 3 millisecond pulse at 173.2 MHz and one millisecond later repeater 14 (FIG. 3) responds with a 2 millisecond pulse in frequency and phase synchronization with the received master unit pulse. Repeater 16 responds with a similar pulse 4 milliseconds after the received master unit pulse terminates. The entire process repeats every 10 milliseconds (FIG. 3), and the phase relationships between the transmitted and subsequently received signals as seen by the master unit are monitored to note and add or subtract differential range changes (i.e., changes in A and B), much in the manner of an interferometer, and these are ultimately used to solve equations (3) and (4), thereby generating the information necessary to determine whether the vehicle is on the proper straight line path and to assist in guiding it back if it is not. For the frequency and implementation chosen, each cycle of phase change between master unit and repeater represents approximately 2.84 feet, and the degree to which partial cycles can be established by any of various means represents the degree of range resolution possible using the specified frequency.

Figure 4:
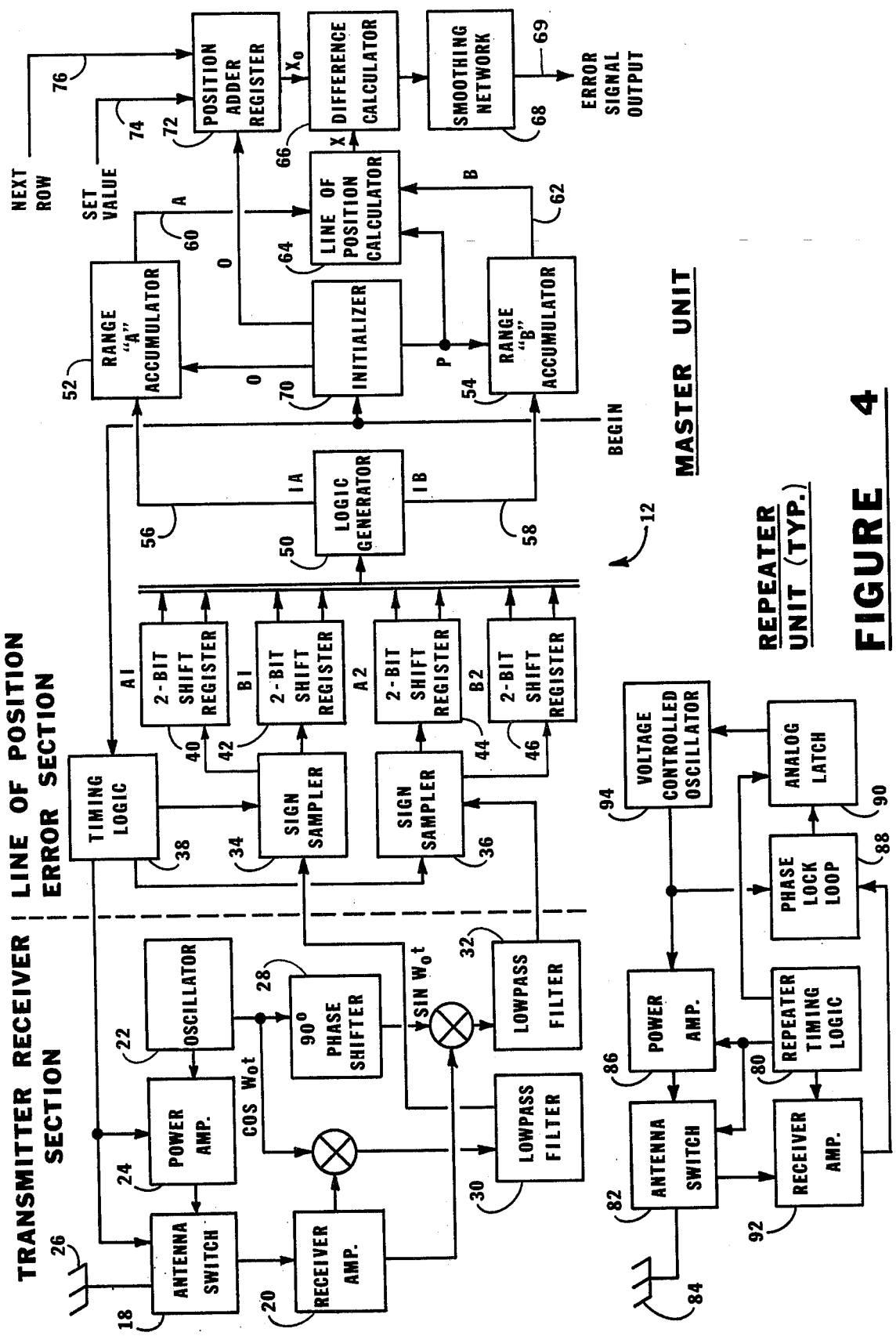
FIG. 4 is an electronic block diagram of the system utilized in this invention.

FIG. 4 shows the master unit electronic block diagram which represents the equipment carried by the navigating person or vehicle which includes generally a "transmitter-receiver", and an error computing circuit. The transmitter receiver section of the master unit generates the basic timing, control, and ranging signals, and accepts and processes signals returned from the repeaters. During transmit times, timing logic 38 causes the antenna switch 18 to disable the receiver amplifier 20 and then allows the basic signal provided by the free-running oscillator 22 to be fed through the power amplifier 24 for transmission via an omnidirectional antenna 26. Timing logic 38 permits this transmission for a period of 3 milliseconds at which time power amplifier 24 is disabled and receiver amplifier 20 is enabled to accept return signals from first one repeater 14 and then the other repeater 16 as shown in FIG. 3, actual generation of the return signals being explained below. As the signals are returned from each repeater 14, 16 they are sequentially and coherently detected with a reference signal provided by oscillator 22 and its quadrature component, respectively, the latter being obtained by passing the reference signal through 90° phase shifter 28. The two detected outputs, one for each repeater return signal, are filtered via lowpass filters 30, 32 whose outputs are the respective inphase and quadrature components of the relative phase shift between reference and returned signals. It will be observed that the value of these signals will vary between one and zero depending upon the phase shift in the returned signals and that the phase shift will be directly proportional to the distances A and B.

From this point on the remainder of the master unit 12 is devoted to extracting the ranges between itself and each repeater 14, 16 and in computing and displaying the error between actual and desired position as the vehicle 11 travels through the field. Lowpass filter 30, 32 outputs are fed to sign samplers 34, 36 wherein a clipping operation takes place such that if any input is positive, its output is "1" and otherwise the output is "0". Thus, sign sampler outputs will change state for each incremental or decremental change (i.e., A or B) between master unit 12 and each repeater 14, 16 in an amount equal to one-eighth of the transmitted signal wavelength. At a frequency of 173.2 MHz, one shift in output signal value from 0 to 1 will occur for each 1.42 feet change in distances A and B. Timing logic 38 directs the sign samplers 34, 36 to pass their current output values once each appropriate opportunity during each 10 millisecond interval, or sample period, to a bank of non-recirculating memory elements as embodied by the 2-bit shift registers 40, 42, 44, 46. The choice of a 10 millisecond interval assures that phase changes do not occur too rapidly, whereby shift registers 40 through 46 are able to "count" all phase shifts considering the speed of the vehicle. Register positions are loaded in such a way as to cause A1 40 to contain at any time the two most recent values of phase shift as determined from repeater 14 and the reference, and A2 44 to contain the two most recent values of phase shift as determined from repeater 14 and the quadrature reference, all as quantized to half-cycles of that phase shift. Registers B1 42 and B2 46 correspond respectively to registers A1 40 and A2 44 except that the information is indicative of signals returned from repeater 16. Bit values resident in the registers are passed to the logic generator 50 wherein once each 10 millisecond period of decision is made to increase, decrease, or leave unchanged the value presently held by each of repeater "A" accumulator 52 and repeater "B" accumulator 54. Logically described, output 56 is "increment" if $$\overline{A1_{\text{old}} \oplus A2_{\text{new}}} + \overline{\overline{A1_{\text{new}} \oplus A2_{\text{old}}}} \tag{5}$$

is true, or "decrement" if $$\overline{A1_{\text{old}} \oplus A2_{\text{new}}} + A1_{\text{new}} \oplus A2_{\text{old}} \tag{6}$$

is true, and "leave unchanged" in all other cases. In the above $\oplus$ represents the exclusive-OR operation and the bar signifies complement. Output 58 is defined in identical fashion where B replaces A in the above equations. Thus, the range accumulator 52, 54 outputs are the actual ranges A and B to the respective repeaters 14, 16, where the distances are stored in numbers of eighth-wavelengths; approximately 0.71 feet, for example. Values thus obtained for signal A on conductor 60 and signal B on conductor 62, together with the value of P, all in common units, are then passed to the line of position calculator 64 wherein the computation indicated by equation (3) is carried out once each sample period to provide the present position X of the master unit 12. This value is in turn passed to the difference calculator 66 wherein equation (4) is implemented using the desired position $X_o$. The resulting error signal is then suitably averaged by smoothing network 68 and presented as an error signal output 69 to the vehicle operator in a convenient form such as by way of example a meter (not shown) in order that he is at all times advised of his performance in keeping the vehicle on the proper straight path.

The master unit 12 and vehicle commence operation at the location of repeater 14. Thereupon an initialization of the system is necessary and provided for as follows: The operator by pushing a button or other such means causes a momentary "begin" signal to be applied to the initializer 70 and timing logic 38. The latter causes the internal clocking and transmit/receive cycling process to commence and the initializer 70 loads a "0" into range "A" accumulator 52 and also loads the proper number of eighth-wavelengths representing P into the range "B" 54 accumulator and the line of position calculator 64. The initializer 70 also loads a "0" into the position adder register 72 which is the first value of $X_o$. Set value 74 is the operator-set value of distance between each parallel straight line path to be traversed, measured also in quarter-wavelength units or converted automatically from feet or other units by any well known and suitable digital to digital converter device. The next row 76 signal occurs each time a new path, contiguous to previous paths, is to be traversed. Actuation of next row 76 causes set value 74 to be added or subtracted, as may be desired, with the present value $X_o$. It is of course obvious that the value of set value 74 can be changed at will at any time during normal operation if equispacing between parallel paths is for any reason not desired, of if a new equispacing is desired.

Also shown in FIG. 4 is an electronic block diagram of one embodiment for a repeater. Except for repeater timing logic 80 all repeaters can be identical. Repeater timing logic 80 determines those portions of a sample period when a repeater is inactive, transmitting, or locking on to a master unit 12 transmission. During a receive period, the antenna switch 82 for antenna 84 is caused by repeater timing logic 80 to disable power amplifier 86 so that only the 3 millisecond master unit transmissions are passed by the receiver amplifier 92 to a phase lock loop 88, whose output is passed through an analog latch 90 to drive a voltage controlled oscillator 94 until the latter's output is in frequency and phase synchronization with the master unit 12 transmission. Shortly before the end of a master unit transmission, repeater timing logic 80 fixes or holds the output of the analog latch 90 and disables the receiver amplifier 92 so as to hold the voltage controlled oscillator 94 output substantially constant. Upon determination by repeater timing logic 80 by preset interval timing circuitry that it is time for the particular repeater to transmit, the antenna switch 82 is caused to disable the receiver amplifier 92 and the power amplifier 86 is enabled, thereby allowing the transmission of the frequency and phase held by the voltage controlled oscillator 94 for a 2 millisecond period to provide the "repeater A" and "repeater B" signals (FIG. 3).

Referring now to FIGS. 7, 8, 9, and 10, there is illustrated a modified embodiment of the invention whereby the phase locking circuitry of the repeaters 14, 16 is eliminated and details of the circuitry of the master unit 12 and the line of position calculator circuit 64 are set forth in greater detail. The master or mobile unit 12 in the embodiment of FIG. 7 utilizes a 10.70 MHz oscillator 100 and a 162.5 MHz oscillator 102 as its primary frequency references. The signals from oscillators 100, 102 are passed through amplifiers 104, 106, respectively and pass simultaneously into RF mixer 108 where the 10.7 MHz and 162.5MHz signals are combined to generate the basic 173.2 MHz signal at output terminal 110 of mixer 108. The 173.2 MHz signal is inputted to a transmitter circuit 112 and gated to transmitting-receiving antenna 26 through a transmit-receive switch 114. A power switch 116 is operatively coupled to each of amplifiers 104, 106, RF mixer 108, transmitter 112, and transmit-receive switch 114 all of which are rendered operative and inoperative in response to operation of the power switch 116, the latter being responsive to an output signal from a timing circuit 118, as explained below.

The receiver portion of master unit 12 again includes the antenna 26 which is coupled to a receiver amplifier circuit 122 through transmit-receive switch 114. The output from receiver amplifier 122 is passed into mixer circuit 124 where it is heterodyned with the 162.5 MHz signal from oscillator 102. The output from mixer circuit 124 is again a 10.7 MHz signal, this signal being passed through a 10.7 MHz crystal filter 126, and an IF amplifier 128. This 10.7 MHz signal is simultaneously applied to the input terminals 130, 132 of phase detector circuits 134, 136, respectively.

The 10.7 MHz signal from oscillator 100 is also applied to phase detector circuits 134, 136. In conventional manner the output of phase detector circuits 134, 136 will vary between a substantially zero level and a maximum level in direct proportion to the phase relationship between the received signal, its quadrature component, and the phase of the 10.7 MHz reference signal from oscillator 100. The output from phase detectors 134, 136 are applied to the input terminals 138, 140 of comparator or level detector circuits 142, 144, respectively. Comparator circuits 142, 144 will generate output signals at their respective output terminals 146, 148 that are either a substantially zero signal or a maximum signal whereby comparator circuits 142, 144 digitize the output signals of phase detectors 134, 136; that is, comparators 142, 144 convert the analog signals from phase detectors 134, 136 into "on" or "off" binary signals depending upon whether the output signals from phase detectors 134, 136 are above or below predetermined levels.

The output signals from comparators 142, 144 are applied to input terminals 150, 152 of increment/decrement logic circuit 154 (FIG. 9 only) which forms a part of computer circuit 160. Circuit 154 again performs the logical solution of equations (5) and (6) to produce increment or decrement signals for the A and B accumulators as explained below. It will be appreciated that the computation of the increment or decrement or no change signal for each of the values A or B are performed sequentially in response to the sequential reception of the signals from repeater A or repeater B and this factor being, in turn, determined by the sequential occurrence of the received signals from the repeaters A and B.

Figure 7:
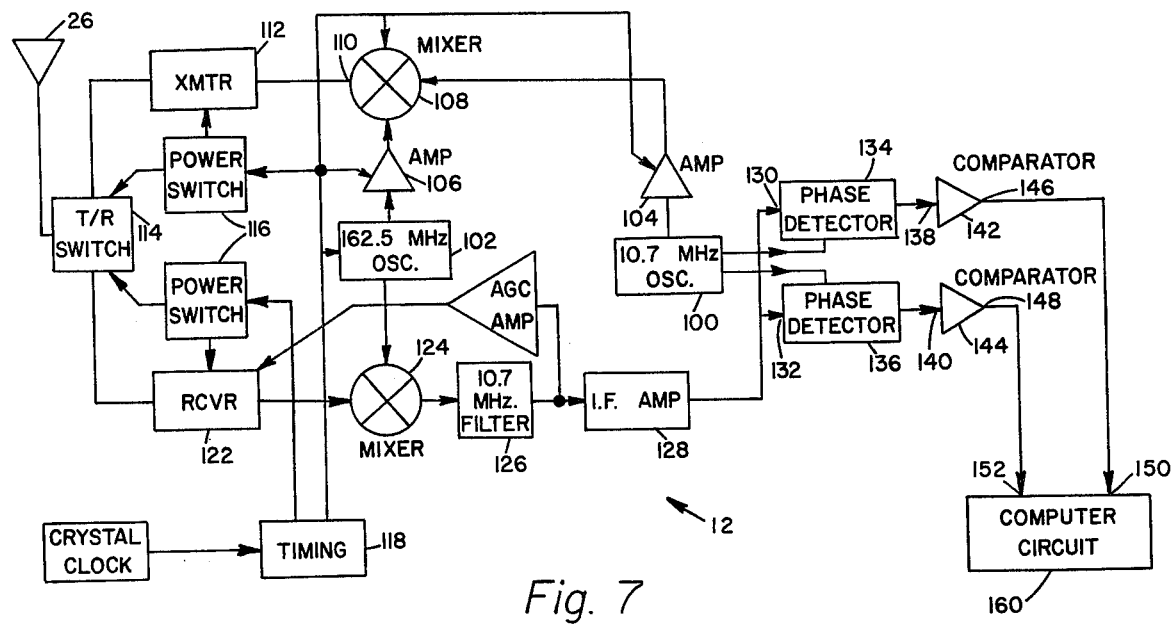
FIG. 7 is an electrical schematic of another embodiment of the mobile unit.
Figure 9:
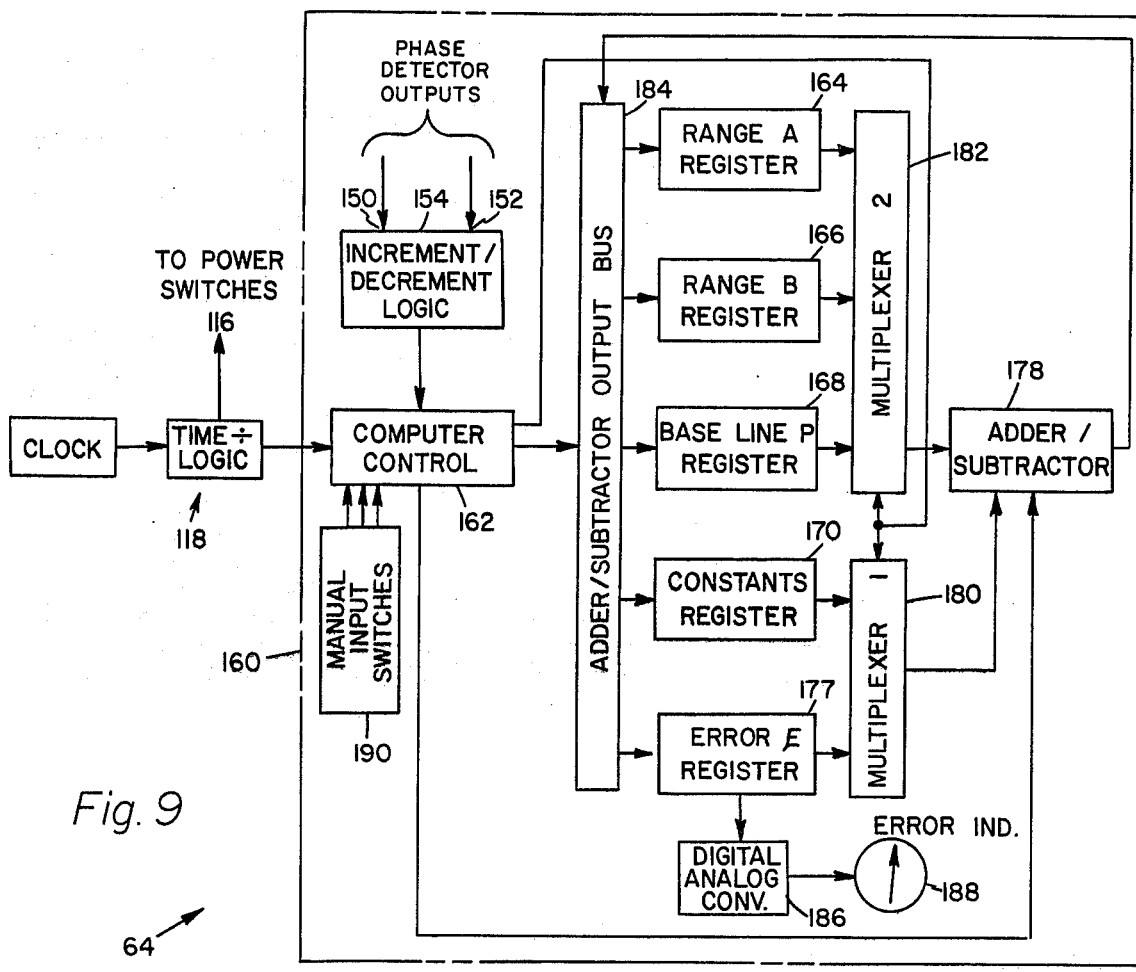
FIG. 9 is a block diagram of the arithmetic and computing circuit portions of the mobile unit.

The computation of the actual location of the vehicle 11 is performed by an error computer indicated in dashed box 160 (FIGS. 7 and 9). Error computer 160 performs a single function, that is, to solve the equation $$E = D - P/2 - (A - B)(A + B)/2P \qquad (7)$$

where E is the lateral position error;
D is the desired position constant (i.e., X);
P is the base line length; and
A and B are the ranges from the repeaters.
The computer circuit 160 is therefore a special purpose machine which produces a running solution to the equation $$E = \sum_{n=1}^{N} \Delta E_n \qquad (8)$$

where $\Delta E_n$ is the change in error between RF phase measurements. Therefore, the equation becomes $$\Delta E_n = \frac{2P\Delta D_n + \Delta A_n(2A_{n-1} + \Delta A_n) - \Delta B_n(2B_{n-1} + \Delta B_n)}{2P}$$

$\Delta$ A and $\Delta$ B are limited to values of zero or plus or minus one by design, these values being the sequentially occurring outputs from the increment/decrement logic circuit 152. The computer thus needs only to compute $\Delta$ E once after each phase shift measurement and add the result to the previous error value.

The error computer 160 comprises generally a computer control circuit 162, computer control 162 including a plurality of logic gates for routing signals between the various components of the error computer under the control of the timing circuit 118. Computer circuit 160 further includes a plurality of accumulators and registers, these being a range A accumulator 164, range B accumulator 166, base line P accumulator 168, constants register 170, and error register 177. Accumulators and registers 164, 166, 168, and 177 are coupled to the output of a simple adder-subtracter circuit 178 and to the output of the computer control circuit 162. Transfer and manipulation of data in the accumulators and registers 164, 166, 168, 170 and 177, and within adder-subtracter 178 is effected through a pair of multiplexers 180, 182, and the adder-subtracter output bus 184. The value in the error accumulator 177 is passed either directly to a digital display through a binary to segment code converter or the like or through a digital to analog converter 186 for display by means of meter 188. Input of constants data required for computation is performed by means of a plurality of control switches, which, as described above, can be mounted conveniently within the cab of the mobile unit. Such manual input devices can be typical thumb wheel switches which provide a simple decimal to binary conversion or any other suitable decimal to binary converting input device many such devices being well known to those skilled in the art.

In operation computer circuit 160 needs only to compute $\Delta E$ once after each phase shift measurement and add the result to the contents of the error accumulator 177. $\Delta D$ is a manual input entered by control switches 190 and again corresponds to the spacing between the parallel paths. A slight rearrangement of equation (9) provides the relationship which eliminates the need for digital division, this equation being $$2P \Delta E_n = 2P \Delta D_n + \Delta A_n(2A_{n-1} + \Delta A_n) - \Delta B_n(2B_{n-1} + \Delta B_n) \qquad (1)$$

Thus, it will be seen that only three (3) simple steps are needed to determine $\Delta E$ after each phase measurement. The actual error E is then determined from the sum $$2P E_n = \sum_{n=1}^{N} 2P\Delta E_n \qquad (11)$$

by means of analog division which may be effected after conversion from a digital signal to an analog signal by digital to analog converter 186. Otherwise, the value will have to be digitally divided by a constant.

Explaining operation of the computer circuit 160 in more detail, the computer control will be seen to comprise an arithmetic section including the 164, 166, 168, 170 and 177 and adder-subtracter 178 and the related multiplexers 180, 182 and adder-subtracter output bus 184. The arithmetic section does the addition and subtraction required to update the range in error accumulators; and the control section including computer control circuit 162, timing circuit 118, and the manual input switches 190 provides timing and gating signals that determine which accumulator is to be updated at any given time. Computer operation is cyclic with one computation cycle occurring for each phase measurement. All cycles are essentially the same; with changes occurring only in values of $\Delta A$, $\Delta B$, and $\Delta D$. Each cycle requires 10 milliseconds to complete. This 10 milliseconds is divided into sub-intervals by the timing circuit 118 each of which is dedicated to performing a particular step in the error computation sequence. The error computation sequence itself proceeds as follows, with the values in parenthesis denoting the contents of the specified accumulator.

Step 1. Add 2P to (E) $\Delta D$ times
Step 2. Add $\Delta A$ to (A)
Step 3. Add or subtract (A) to/from (E)
Step 4. Add $\Delta A$ to (A)
Step 5. Add $\Delta B$ to (B)
Step 6. Add/subtract (B) to/from (E)

Step 7. Add $\Delta B$ to (B)

In the above steps, $\Delta D$ can be positive, negative, or zero while values of $\Delta A$ and $\Delta B$ are again limited to zero or plus or minus one. At the end of each cycle, range A accumulator 164, range B accumulator 166 and error accumulator 177 have all been updated and contain the new values $2A_n$, $2B_n$ and $2PE_n$ respectively.

Circuit operation during the computaton cycle is as follows:

STEP 1

The value of $\Delta D$ (input by manual switches 190) is registered by computer control 162. Base line P register 168 (which contains the value 2P) is then gated through multiplexer 182 to the adder-subtracter 178 and the contents of error accumulator 177 are gated through multiplexer 180, again to adder-subtractor 178. $\Delta D$ addition (or subtraction) cycles are then performed with each new sum or difference replacing the old value in the error accumulator 177 via the adder-subtracter output bus 184. Arithmetic cycles are counted by the control logic which stops the operation after $\Delta D$ such cycles have occurred.

STEP 2

The contents of range accumulator 164 are gated through multiplexer 182 to adder-subtractor 178. The constant "1" or "0" is gated through multiplexer 180 to the adder and the contents of range A accumulator 164 is increased or decreased by one or zero as dictated by the value of $\Delta A$. The new values taken from the adder-subtracter output bus 184 replaces the old contents of range A accumulator 164. $\Delta A$ is determined from the last phase measurement and the increment-decrement logic 154. If the distance from repeater A has changed sufficiently since the last phase measurement, $\Delta A$ will be plus or minus one (plus for increase, minus for decrease) while no change in range (or less than a minimum measurable increment) results in a value of zero for $\Delta A$.

STEP 3

The contents of range accumulator A are gated again through multiplexer 182 to the adder-subtracter 178 while the contents of error accumulator 177 are gated through multiplexer 180 thereto. The sum or difference from the adder replaces the previous contents of the error accumulator.

STEP 4

The contents of range accumulator A are again gated through multiplexer 182 to the adder-subtracter and STEP 2 above is repeated.

STEP 5

The next steps repeat STEPS 2, 3, and 4 using the contents of range accumulator B 166 in place of the contents of range accumulator A 164.

The computer control 162 further includes a high frequency clock, a block of time division logic, and arithmetic control logic. The time division logic divides a clock frequency from a crystal controlled source of 4 MHz down to a 100 Hz signal. This provides the basic computers cycle time. Timing circuit 118 further divides the 10 millisecond period into 10, 1 millisecond periods and further divides these 1 millisecond periods into shorter increments as required for specific arithmetic functions. The timing logic provides a cyclic base of operation for the arithmetic control logic; that is, it allocates specific time intervals for particular arithmetic functions and it partitions the basic cycle into the periods needed for performing the steps in the error computation.

The computer control 162 operates the arithmetic section by control signals which:
1. Select the add or subtract mode of the adder-subtracter 178 operation;
2. Select the two adder-subtracter 178 inputs to be used in a given computation; and
3. Select the destination for the output signal from the adder-subtracter 178.

The control signals are derived from logical combination of the control inputs, namely the timing, phase measurement results, and manual inputs. In general, the timing inputs determine which accumulators and registers are operated upon while the variable inputs determine the operation to be performed. Thus, to perform Step 1, base line P register 168 and error accumulator 177 are selected based on the time and the cycle. A manual $\Delta D$ input is obtained from manual switches 190. A manual $\Delta D$ input results in an operation involving those accumulators and registers. If $\Delta D$ is positive, addition occurs or, if $\Delta D$ is negative subtraction takes place. If no $\Delta D$ input is performed, nothing happens. Steps 2 through 7 involve similar processes which in view of the above description are easily deduced by those skilled in the art.

Analog circuit control is the direct function of the computer timing. Transmit-receive timing and phase measurement times are all closely related and must necessarily be done in synchronism with the computation function whereby timing of the mobile unit timing for the repeater circuits are all derived from the same timing circuit 118.

Figure 8:
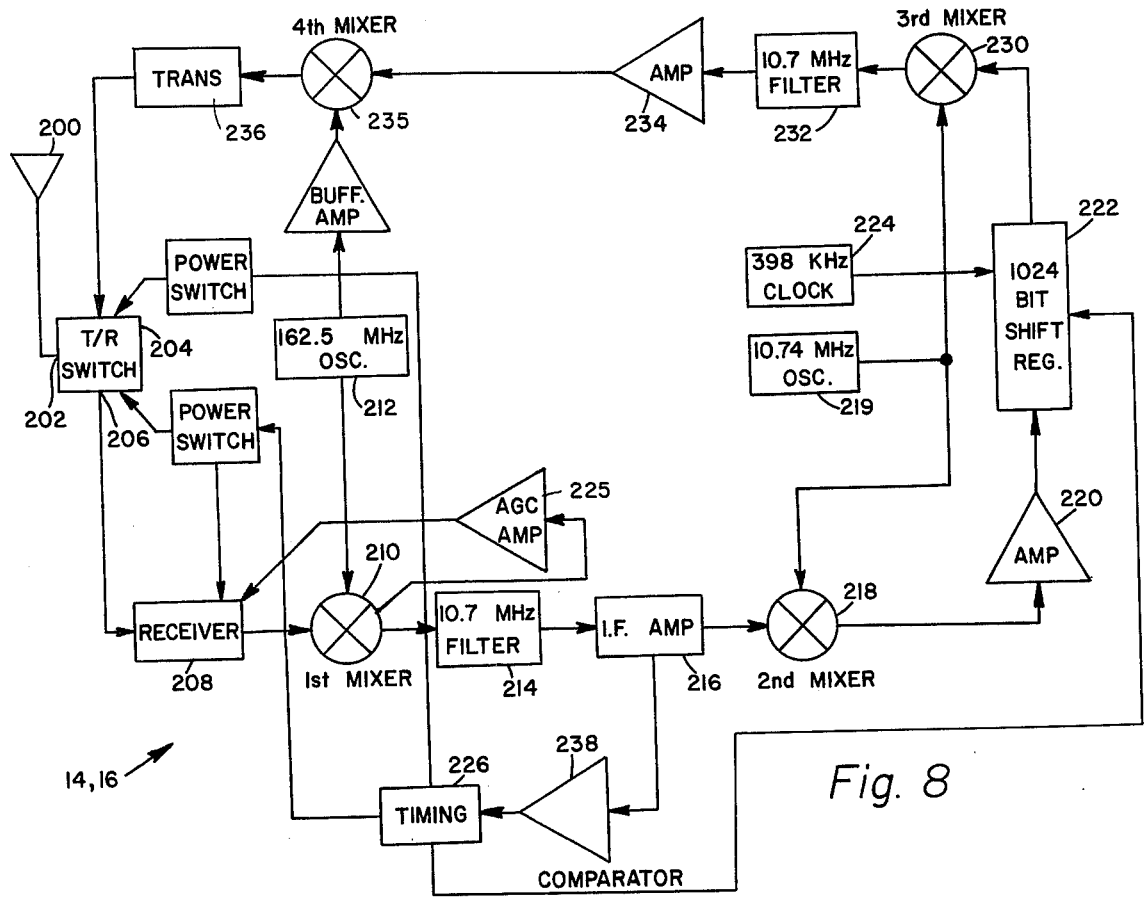
FIG. 8 is an electrical schematic of another embodiment of the repeater units for use with the present invention which eliminates use of a phase lock circuit.

Referring now to FIG. 8, there is illustrated an embodiment of the repeater circuitry, i.e., either repeater A or repeater B which operates without the use of a phase lock loop. Repeater circuits 14, 16 comprise generally an antenna 200 connected to the input terminal 202 of a transmit-receive switch 204. Output terminal 206 of tranmsit-receive switch 204 is connected to a receiver amplifier 208 and is passed therefrom into a first repeater mixer circuit 210. the repeater also contains a crystal controlled 162.5 MHz oscillator 212 which generates a reference signal which is heterodyned with the signal received from receiver circuit 208 within the first repeater mixer 210. The output from first repeater mixer 210 is passed through a 10.7 MHz crystal filter 214 and an IF amplifier 216 and into the input of a second repeater mixer circuit 218. The second repeater mixer reference signal is derived from a 10.74 MHz oscillator whereby the output of second repeater mixer 218 is a 40 KHz signal. This signal is amplified by an amplifier 220 and passed into a 1024 bit shift register 222. The receiver portion of repeater circuit 14, 16 may also be provided with a conventional automatic gain control (AGC) amplifier circuit 225 for improved operation.

Figure 10:
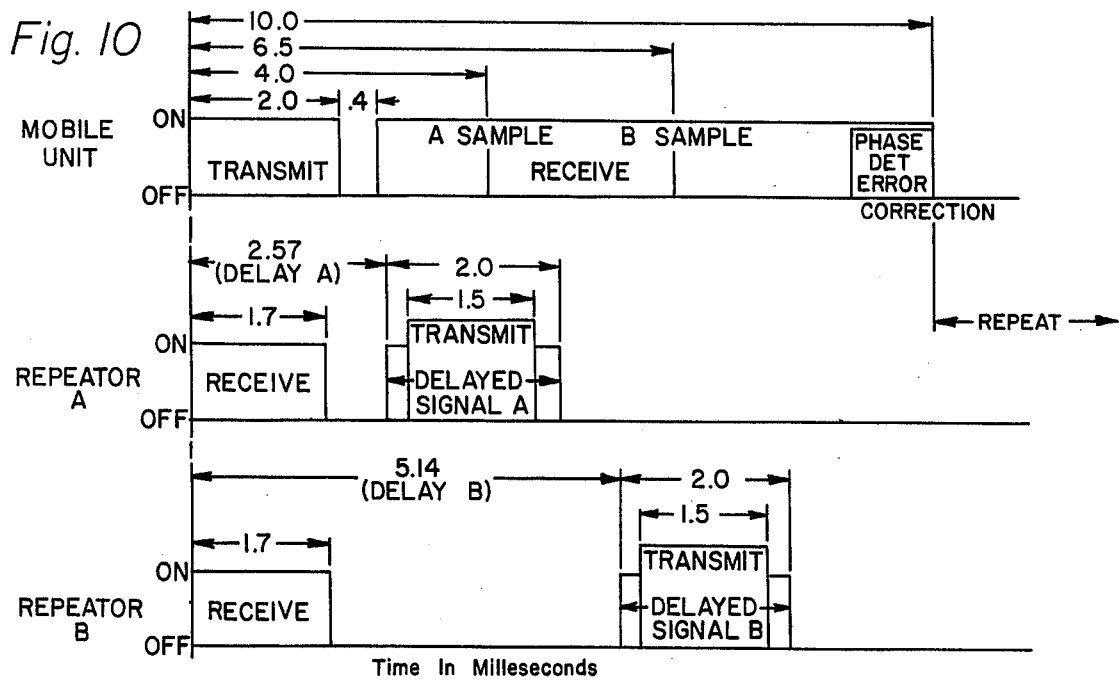
FIG. 10 is a timing chart showing the operational relationship in time of the various portions of the invention.

It will be observed that the output of amplifier 220 is in effect a plurality of pulses. These pulses are loaded into 1024 bit shift register 222 under control of a 398 KHz crystal controlled clock 224. It will now be seen that at a frequency of 398 KHz it will take about 2.57 milliseconds for the first pulse shifted into shift register 222 to reach the output 227 thereof. By application of a suitable control signal from an internal timing circuit 226, the pulses arriving at output 227 can either be outputted therefrom or recycled through the 1024 bit shift register 222. It will thus be observed that by passing the pulses or signal from amplifier 220 through the shift register 222 one or more times, a very precise and repeatable delay can be induced to the signal. The output signal is then heterodyned with a 10.74 MHz oscillator signal via third repeater mixer 230, passed through a 10.7 MHz crystal filter 232, amplifier 234, heterodyned with the 162.5 MHz signal from oscillator 212 via a fourth repeater mixer 235, and retransmitted through a transmitter circuit 236 connected to antenna 200 through transmit-receive switch 204. Control of the transmit-receive operation is effected through a signal detector circuit 238 connected to receiver IF amplifier 216, the output signal from signal detector 238 being applied to a simple timing signal generator 226. Timing circuit 226 generates an output signal for disabling receiver 208 after a predetermined delay period (2.7 milliseconds in a working embodiment) and disabling and subsequently enabling the transmitter circuit 236 and, simultaneously controlling operation of the shift register 222 at an appropriate time in the operating sequence of the repeater. An actual timing sequence used in operation of the system of the present invention is shown in FIG. 10 wherein the time occurrence of all of the signals during operation of the circuit are illustrated and appropriately labeled. Using the repeater circuitry of FIG. 8, a precise phase coherence between the transmitted signal from the mobile unit does not exist. However, the initial phase relationship is highly repeatable in view of the precise nature of the signal delay effected by the repeater of FIG. 8. Thus, once an error sequence is begun, the repeatability of the phase relationship obviates the need for a true phase lock relationship.

Figure 5:
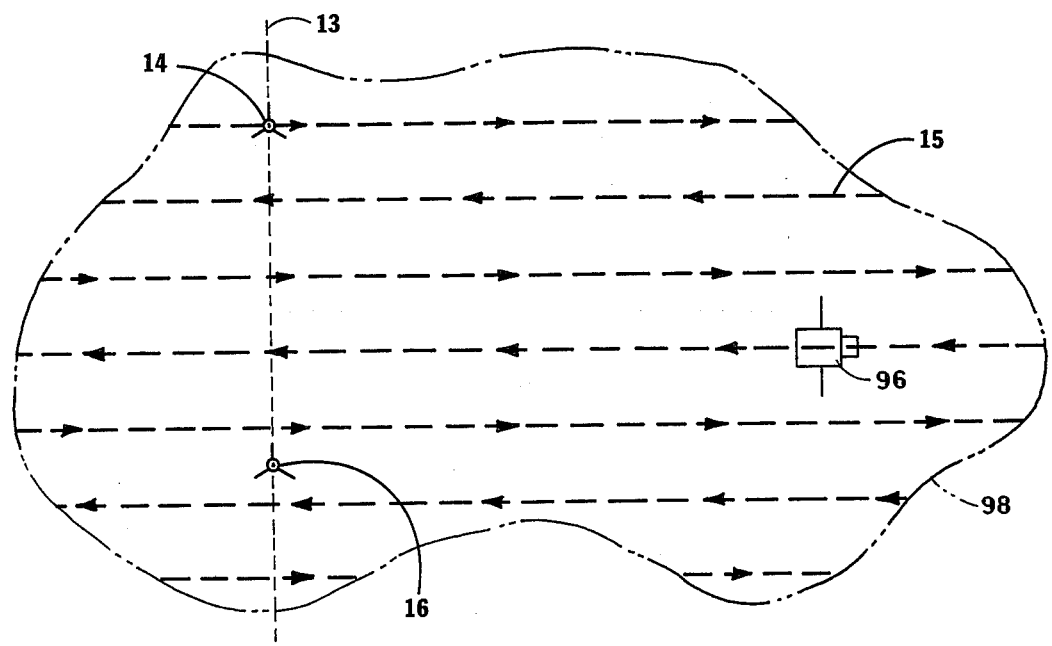
FIG. 5 is a top view illustrating how an agricultural vehicle may traverse a plurality of parallel paths in covering a field.

FIG. 5 shows how this invention may be utilized to maintain a straight line path 15 for an agricultural vehicle 11 as it traverses an entire field 98 to gain even coverage of the field 98. In an agricultural operation it is necessary that areas not have excess coverage since this could lead to crop damage. Since such an application for this system need normally not exceed a range of 0.5 miles, transmitting antenna 84 and 26 heights of less than 20 feet and peak radiated powers of less than one watt are suitable to provide the necessary signal strength with position measurement accuracy of better than one foot for the frequency chosen and for all typical vehicle operating speeds. Furthermore, the system is portable and may be carried from field to field by the applicator vehicle 11. Upon entering the field 98 in which chemicals, for example, are to be applied, the operator of the vehicle 96 first deploys repeater 16 at the edge of the field 98, or in any convenient location, as such is shown in FIG. 1. At selected distance, i.e., 500 feet away, the user deploys repeater 14 in such a way that an imaginary line drawn between the repeaters 14, 16 is normal to the intended paths of travel during chemical application. Then after entering the desired row spacing and distance P into the master unit 12, either manually by means of thumbwheel switches or dials, or automatically by measurement or preprogramming of the master unit 12, the vehicle 11 may then commence traversing its series of paths 15 beginning at repeater 14 and heading away in the direction of the positive y-axis, for example. After traversing the field 98 to the opposite end the operator turns the vehicle away from the straight line path he had been following in order to head in the opposite direction, applying chemicals in the next contiguous row. As he makes the turn, the operator activates the next row input switch 76 which automatically causes the desired row spacing to be added to the desired line of position, $x = X_o$. This process is continued until the entire field 98 has been uniformly covered. The row spacing is, of course, determined by the width of the applicator coverage envelope and other pertinent factors. It is to be noted that the sense of left and right must be alternated each time a next row signal is activated to compensate for vehicle travel in opposite y directions.

Figure 6:
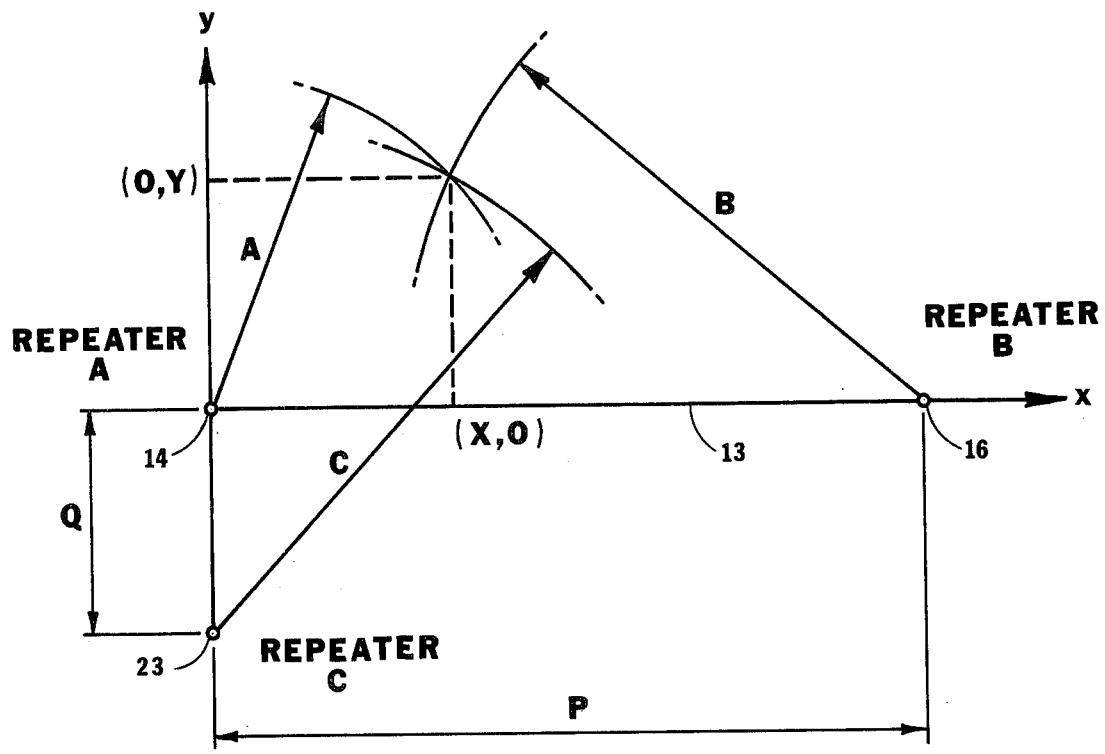
FIG. 6 shows again by x, y coordinates an alternate positioning of repeaters a and b in order to solve the y coordinate positioning of a vehicle.

FIG. 6 shows an alternate embodiment in x, y coordinates for solving for the y coordinate, that is the distance that would be vertical as shown in FIG. 6 rather than as horizontal which is the x distance. In this case repeater 16 is replaced by or a new repeater alternately can be supplied at point C, 23 point C being spaced a distance Q from point A. With this arrangement y can be computed directly using the distance Q in place of distance P and C in place of B in the equations brought out hereinabove. Alternately, if desired, y could be computed with a minor ambiguity from equation (1) hereinabove after X is known.

As can be seen from the foregoing this invention permits a vehicle 96 to be moved along a straight line and any deviations therefrom immediately indicated. In addition, this invention permits a plurality of straight line paths to be followed with equal spacing between paths if desired as would be needed for example for some farm operations.

It should be understood from the foregoing description, that the principal aim of the present invention has been accomplished, via the securement of straight line navigating data obtainable with an economical receiver so that navigational equipment is employable, for example, in navigating land vehicles or ships, boats, aircraft and the like. An important feature of the present invention is that the distance between the pair of repeaters is automatically determinable as the vehicle travels from one to the next and such value then automatically entered into the initializer 70 (FIG. 4). It should be further understood that the specific frequency transmitted by repeaters 14, 16 as well as the master unit does not have to be the same. Also, finer range resolution is obtainable by using an internal frequency of higher value than that which is actually transmitted. Heterodyning down the transmitted and received signals to some satisfactory intermediate frequency will allow internal processing to take place at the lower frequency without in any way degrading the range resolution.

In any event, the specific frequency which is chosen for transmission is selected within the ability to resolve a cycle of phase change to an amount corresponding to the range resolution desired. Therefore, for the given frequency, together with resolution of eighth-wavelengths, it is possible, for example, to provide a range increment in the order of one foot and this increment is changeable either by providing amounts greater or less than one foot in accordance with the particular design application. One obvious advantage to having more than one transmission frequency is the considerable simplification of the timing, phase locking and multiplexing requirements, all of which would of course simplify the transmitter-receiver section of the master unit (FIG. 4) and the repeaters. The same result applies to the use of several side bands of a single carrier. It could prove particularly advantageous when a number of frequencies related to a common frequency by some integer multiple, is employed. Also the wave energy does not particularly have to be electromagnetic in character and the present invention contemplates the transmission of acoustic energy as well; or, some of the energy can be transmitted over a direct connection if this is desired. In the case of transmitted signals of non-wave variety for the range data, it is the round trip transit time such as obtained in radar, sonar, laser systems, etc. which is digitized and used with the present invention. Consequently, the scheme of the invention can use any range deviation measurement however such measurement may be obtained. The system is also adaptable to provide range rate or speed information in which case the same information is provided in the manner before described to compensate for quasistatic indicator errors while the vehicle is slowing or stopping.

It will further be observed that the system of the present invention can be adapted for use in other applications wherein it is desired to traverse a plurality of straight line paths equally spaced and parallel. For example, such applications may include geophysical survey, oil surveying and the like applications wherein it is important to navigate straight parallel paths over a prescribed area in order to correlate recorded data with position.

The error information, which is the output from the smoothing network 68, is recordable, such information being of some use for later review to determine whether there has been applicator overlap or miss. From the foregoing description also, it should be pointed out that the initial location of the vehicle does not have to be coincident with the repeater 14 so long as any known coordinate location is fed into the initializer 70.

The navigational equipment is usable for land, sea and air vehicles and the range can be in the order of feet or miles, as a matter of design criteria.

Although the present invention has been illustrated and described in accordance with example embodiments, it is understood that this is illustrative of the invention and is by no means restrictive thereof. It is reasonably to be expected that those skilled in this art can make numerous revisions and adaptations and it is intended that such revisions and adaptations will be included within the scope of the following claims as equivalents of the invention.

What is claimed is:

1. A system for guiding a vehicle along a selected one of a plurality of spaced, straight line and parallel paths, the system comprising first and second radio signal repeaters, said repeaters being positioned a selected distance apart on a line transverse to said paths, said repeaters including means for receiving a burst of radio signals having a predetermined frequency and alternately retransmitting said bursts in a predetermined time sequence, a mobile unit including means for cyclically and repetitively generating and transmitting said bursts of radio signals, means for receiving and demodulating said retransmitted bursts from said repeaters in sequence, and incremental range signal generating means connected to said receiving and demodulating means for generating first and second incremental range signals proportional to the incremental movement of said mobile unit with respect to said first and second repeaters, respectively, computing circuit means connected to receive said incremental range signals for arithmetically combining same to generate an incremental error signal when said movement deviates from a said selected path and error indicating means connected to receive said incremental error signal for continuously generating an indication of the magnitude of said incremental error signal.

2. The system of claim 1 wherein said mobile unit receiving and demodulating means includes means for generating analog signals proportional to the incremental movement of said mobile unit from each of said repeaters, said incremental range signal generating means including level detecting circuit means for generating a digital signal therefrom.

3. A system of claim 2 wherein said computing circuit generating means includes logic circuit means connected to said level detecting circuit means for generating an increment signal in response to said digital signals when the position of said mobile unit from said line has increased by an amount greater than a predetermined value, a decrement signal when the distance of said mobile unit from said line decreases by an amount greater than said predetermined value, and a zero signal when movement of said mobile unit from said line is less than a predetermined value between individual ones of said bursts.

4. The system of claim 1 wherein said mobile unit further includes timing means for sequentially and alternately energizing said transmitting and receiving means thereof for predetermined time intervals, respectively, said repeaters including delay means for retransmitting said burst of radio frequency signals at first and second predetermined fixed time delays following reception of each said burst, said computing circuit means including range signal accumulator means for a accumulating said incremental range signals to thereby generate first and second accumulated range signals proportional to the movement of said mobile unit from said first and second repeaters and incremental error accumulator means responsive to said mobile unit timing means for generating said incremental error signal in response to each reception of a said first and second retransmitted signal.

5. The system of claim 4 wherein said computing means further includes digital binary circuit means for arithmetically combining said accumulated range signals and generating said incremental error signal.

6. The system of claim 5 wherein said means for generating an indication of the magnitude of said incremental error signal comprises means for generating a visual display of said accumulated error signals.

7. The system of claim 5 further including manually operable input means for generating digital-constant signals proportional to the selected spacing between adjacent ones of said paths, said computing circuit means further combining said digital-constant signals with said accumulated incremental range signals to generate a said incremental error signal corresponding to deviation in the movement of said vehicle from a said selected one of said plurality of straight line parallel paths.

8. A system for guiding a vehicle along a selected one of a plurality of spaced, straight line and parallel paths, the system comprising first and second radio signal repeaters positioned a selected distance apart on a line transverse to said paths, said repeaters including means for receiving a burst of radio signals and retransmitting said signals in a predetermined time sequence and with a predetermined phase relationship to said burst of radio signals, a mobile unit including means for cyclically and repetitively transmitting said burst of radio signals, means for receiving said retransmitted signals, and means for phase demodulating said retransmitted signals and the quadrature component thereof to generate incremental range signals proportional to movement of said mobile unit between individual ones of said bursts of radio signals, and a computing circuit, said computing circuit including means for arithmetically combining said incremental range signals to generate an error signal when said movement deviates from a said selected path.

9. The system of claim 8 wherein said incremental range signal generating means includes comparator circuit means for generating an incremental signal when the position of said mobile unit from each of said first and second repeaters has increased by an amount greater than a predetermined value, a decrement signal when the distance of said mobile unit from said line decreases by an amount greater than said predetermined value and a zero signal when said distance changes less than said predetermined value, respectively, between individual ones of said bursts of radio signals.

10. The system of claim 8 wherein said mobile unit further includes timing means for sequentially and alternately energizing said transmitting and receiving means thereof for predetermined time intervals, said repeaters including time delay means for receiving, holding, and outputting said burst of radio signals at first and second predetermined time delays following reception of each said burst, said receiving and demodulation means being responsive to said mobile unit timing means for generating a said incremental range signal in response to reception of each of said first and second retransmitted signals, said computing circuit means including means for accumulating said incremental range signals, to thereby generate first and second accumulated range signals proportional to the movement of said mobile unit from said first and second repeaters, respectively.

11. The system of claim 10 wherein said computing means further including digital arithmetic circuit means for digitally combining said accumulated range signals and generating said error signal.

12. The system of claim 11 wherein said digital arithmetic circuit means includes means for digitally combining said incremental range signals in response to each said burst of said radio signals, said computing means further including range accumulator means for accumulating said combined incremental range signals to thereby generate said error signal.

13. The system of claim 12 further including manually operable input means for inputting into said computer circuit means constant signals proportional to said selected space between said paths, said computing circuit means further arithmetically combining said constant signals with said incremental range signals to generate a said error signal corresponding to deviation in the movement of said vehicle from a said selected one of said plurality of spaced, straight line, parallel paths.

14. A system for guiding a vehicle along a selected one of a plurality of spaced, straight line and parallel paths, the system comprising first and second radio signal repeaters, said repeaters being positioned a selected distance apart on a line transverse to said paths, said repeaters including means for receiving a burst of radio signals and retransmitting said signals in a predetermined time sequence and at predetermined fixed time delays following reception of said burst of radio signals, a mobile unit including means for receiving said retransmitted signals, means for generating first and second incremental range signals in response to the phase shift between said transmitted and said retransmitted radio signals during the time period between said bursts, and computing circuit means for generating an error signal by accumulation and arithmetic combination of said incremental range signals when said movement deviates from a said selected path.

15. The system of claim 14 wherein said repeaters each include clock circuit means for causing said repeaters to retransmit said signals in a predetermined time, and thereby, in predetermined phase relationship to said burst of radio frequency signals.

16. The system of claim 15 wherein said clock circuit means includes crystal controlled oscillator means for generating a control signal for delaying retransmission of said retransmitted signal for a predetermined fixed time period following each said burst to thereby establish a fixed phase relationship with said burst of radio frequency signals.

17. The system of claim 14 wherein said means for receiving and retransmitting a burst of radio frequency signals includes a receiving circuit, a transmitting circuit, and timing circuit means responsive to reception of said bursts for disabling said receiving circuit after a predetermined time period following commencement of said bursts and energizing said transmitting means for a second predetermined time following said bursts, said receiving means including a frequency translating circuit, said timing circuit means including clock circuit means for generating clock signals, said timing circuit means including shift register means coupled to receive frequency translated radio frequency signals from said frequency translating circuit for shifting said frequency translated radio signals a preselected number of times therethrough in response to said clock signals to thereby effect said predetermined fixed time delays, said transmitting means being connected to the output of said shift register to receive said frequency translated radio signals.

18. A system for guiding the movement of a vehicle along one of a plurality of spaced and parallel straight line paths, the system comprising: range measuring means for automatically and repetitively measuring the distance of said vehicle from first and second spaced apart reference points as said vehicle moves with respect thereto, said range measuring means including means for generating first and second incremental range signals proportional to said movement of said vehicle with respect to said first and second reference points, respectively, computing circuit means including means for accumulating said first and said second incremental range signals and means for linearly arithmetically combining same, to generate an incremental error signal proportional to the deviation in the movement of said vehicle from a said straight line path, and error indicating means connected to said computing circuit means to receive said incremental error signal for generating an indication of the magnitude of said accumulated incremental error signals.

19. The system of claim 18 wherein said means for logically arithmetically combining said first and said second incremental range signals includes a binary arithmetic circuit.

20. The system of claim 19 further including means for inputting into said computer a plurality of binary constant signals proportional to the space between adjacent ones of said paths and base line circuit means for generating a second constant signal proportional to the space between said first and said second spaced apart reference points in response to movement of a said vehicle from one of said repeaters to the other thereof, said computing circuit means including means for combining said constant signals and said incremental range signals to generate said incremental error signal.

* * * * *

UNITED STATES PATENT OFFICE
CERTIFICATE OF CORRECTION

Patent No. 4,083,047         Dated April 4, 1978

Inventor(s) Rudolph D. Schalow

It is certified that error appears in the above-identified patent and that said Letters Patent are hereby corrected as shown below:

Column 8, line 65, after base line P delete "accumulator" insert ---register---.
 line 66, before 177 delete "register" insert ---accumulator---.
Column 9, line 43, before 164 insert ---accumulators and registers---.
Column 15, line 9, delete "generating".

Signed and Sealed this

Third Day of October 1978

[SEAL]

Attest:

RUTH C. MASON
Attesting Officer

DONALD W. BANNER
Commissioner of Patents and Trademarks